March 1, 1927.
F. C. OWEN
1,619,629
TRANSFORMER FOR ELECTRIC ARC CUTTING, REPAIRING, AND WELDING APPARATUS
Filed Nov. 19, 1925
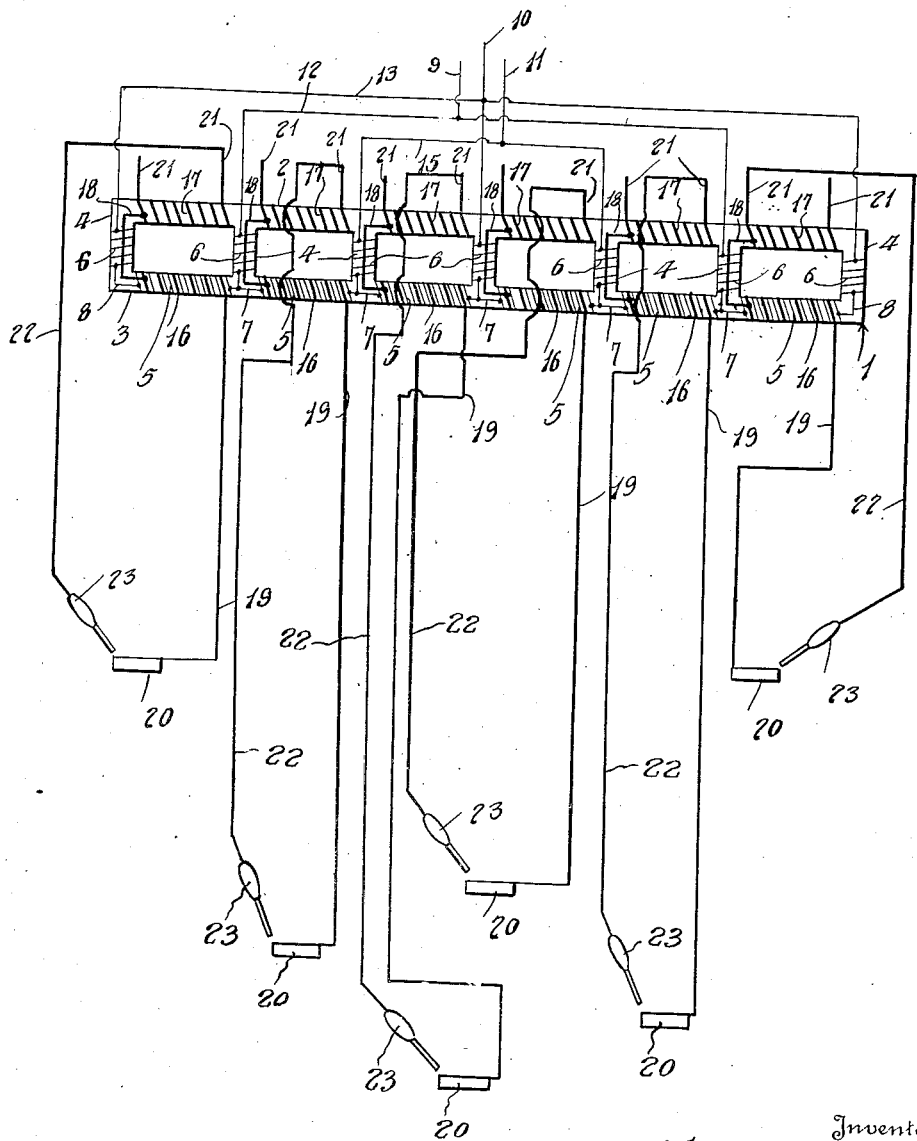
Inventor
F. C. Owen
Attorney Patented Mar. 1, 1927.

1,619,629

UNITED STATES PATENT OFFICE.

FREDERICK C. OWEN, OF FAYETTEVILLE, NORTH CAROLINA.

TRANSFORMER FOR ELECTRIC ARC CUTTING, REPAIRING, AND WELDING APPARATUS.

Application filed November 19, 1925. Serial No. 70,084.

This invention relates to alternating current electric arc cutting, repairing and welding apparatus and more particularly to polyphase transformers for such apparatus.

The invention has for one of its objects to improve and simplify the general construction of transformers of this character and to provide one that shall be so wound and constructed as to permit the apparatus embodying the same to be used for the purpose of simultaneously performing a plurality of distinct cutting, repairing or welding operations.

A further object of the invention is to provide a transformer of the character stated which will prevent the work of one operator from interfering with that of another and which will permit each operator to readily maintain a uniform arc of high power factor.

A still further object of the invention is the provision of a transformer of the character stated which will be so wound and constructed as to obviate the necessity of the use of fans or other mechanical cooling means and the use of flux diverters, damping devices or manually operated resistances or reactances for regulating the current and potential in the primary and secondary windings.

With the foregoing and other objects in view, the invention consists of the novel construction, combination and arrangement of parts hereinafter fully described and claimed, and illustrated in the accompanying drawing, wherein:

The figure is a diagrammatic view of an alternating current electric arc cutting, repairing and welding apparatus embodying a transformer constructed in accordance with my invention.

The transformer embodies a core 1 which is of elongated rectangular formation and laminated construction and which embodies longitudinal legs 2 and 3 and transverse legs 4.

The primary winding of the transformer comprises coils 5 which are mounted on the legs 3 between the legs 4 and coils 6 which are mounted on the legs 4. The coils 5 are connected in series by wires 7, and the coils 6 are connected in series with the coils 5 by wires 8. Leads 9, 10 and 11 which extend to the power circuit, are connected to the coils 6 by wires 12, 13 and 14, and 15, respectively.

The secondary windings of the transformer each comprises a main or voltage regulating coil 16 and an auxiliary or current regulating coil 17 connected in series by a wire 18. The main or voltage regulating coils 16 are mounted on the leg 3 between the legs 4, and the auxiliary or current regulating coils 17 are mounted on the leg 2 between the legs 4. Each of the main or voltage regulating coils 16 is connected by a lead 19 to the work 20 which is to be cut, repaired or welded. Each of the auxiliary or current regulating coils 17 is provided with taps 21 any one of which is adapted to be connected by a lead 22 to the cutting, repairing or welding electrode 23.

The core 1 provides a plurality of closed flux paths. Current flowing through the coils 5 and 6, constituting the primary winding, tends to cause a magnetic flux to circulate through each of the paths provided therefor by the core 1. Practically all the flux developed by the primary winding will thread the main or voltage regulating coils 16 of the secondary windings, because of the close association of these coils with the coils 5 and 6 of the primary winding, and flux in those parts of the core 1 about which the coils 5 and 6 of the primary winding extend remains substantially constant at all loads. As the result, the voltage generated in the main secondary coils 16 likewise remains practically the same at all times, and does not vary with the load.

The auxiliary or current regulating coils 17 of the secondary winding, however, being remote from the primary winding, tend to set up a flux independent of and opposed to that generated by the primary winding. Owing to the location of these coils, the secondary flux is confined substantially to the leg 2 of the core 1, while the primary flux alone threads the legs 3 and 4. The opposing fluxes meet in the leg 2 in the neighborhood of the juncture of the legs 4 therewith, and, as a result, a substantial amount of flux is forced out of the closed metallic paths into the air, or, in other words, a very noticeable flux leakage takes place in the leg 2 at points adjacent to or in alinement with the legs 4. The larger the current drawn from the secondary winding, the greater the flux leakage becomes.

As a result of such leakage, a heavy secondary flux causes the coil 11 of each secondary winding to develop high inductance, and act as an impedance coil, so that the phase of the voltage in this part of each secondary winding is shifted. It will thus be understood that when current flows through the primary winding, a constant main voltage and a variable secondary voltage is induced in each secondary winding. The reaction between these voltages is such that there is induced, in the secondary circuit including the work and electrode, a light current at light load and a heavy current at heavy load, with the result that a stable arc of high power factor may be readily maintained during overhead, vertical and horizontal cutting, welding or repairing of steel, wrought iron, cast iron, malleable iron, aluminum, brass, bronze, copper and other alloy metals. Furthermore, the arc is free from sputtering and spitting, and it has been found that a skilled operator can maintain an arc within one and one-half per cent plus or minus of the rated capacity of the tap with which the electrode is connected. It has also been found that the work being done by one operator will not in any way prevent another or others from maintaining a uniform arc of high power factor.

What is claimed is:—

1. A transformer comprising longitudinal and transverse legs, a primary winding distributed about one of the longitudinal and the transverse legs, and a plurality of independent secondary windings distributed about the longitudinal legs.

2. A transformer comprising a core having longitudinal and transverse legs, a primary winding distributed about one of the longitudinal and the transverse legs, a plurality of independent secondary windings each consisting of a main coil and auxiliary coils on the longitudinal leg.

3. A transformer comprising a core having longitudinal and transverse legs, a primary winding comprising coils distributed about one of the longitudinal legs between the transverse legs and connected in series and coils distributed about the transverse legs and connected in series with the first named coils, and secondary windings distributed about the longitudinal legs and each consisting of a pair of coils connected in series.

4. A transformer comprising a core, a primary winding on a part only of the core, and a plurality of independent secondary windings on the core and each embodying a main coil closely associated with the primary winding and an auxiliary coil remote from the primary winding.

5. A transformer comprising a core, a primary winding on a part only of the core, and a plurality of independent secondary windings on different parts of the core and each embodying a main coil closely associated with the primary winding and an auxiliary coil remote from the primary winding.

6. A transformer comprising a core providing a plurality of closed magnetic paths, a primary winding on a part only of the core, and a plurality of independent secondary windings on the core and each embodying a main coil closely associated with the primary winding and an auxiliary coil remote from the primary winding.

7. A transformer comprising a core providing a plurality of closed magnetic paths, a primary winding on a part only of the core, and a plurality of independent secondary windings on different parts of the core and each embodying a main coil closely associated with the primary winding and an auxiliary coil remote from the primary winding.

8. A transformer comprising a core having a plurality of longitudinally extending legs and a plurality of intermediate legs connecting said first named legs, a primary winding comprising coils distributed about one of the longitudinal legs between the intermediate legs and connected in series, said winding also comprising coils distributed about the intermediate legs and connected in series with the first named coils, and a plurality of independent secondary windings each embodying a main coil closely associated with the primary winding and a auxiliary coil remote from the primary winding, the coils of each secondary winding being positioned on the longitudinal legs of the core between a pair of intermediate legs thereof.

9. A transformer comprising a core having a plurality of longitudinally extending legs and a plurality of intermediate legs connecting said first named legs, a primary winding distributed about one of the longitudinal and the intermediate legs, and a plurality of independent secondary windings each consisting of a main coil closely associated with the primary winding and an auxiliary coil on the other longitudinal leg of the core.

In testimony whereof I affix my signature.

FREDERICK C. OWEN.